(12) United States Patent
Gödeke et al.

(10) Patent No.: US 10,745,317 B2
(45) Date of Patent: Aug. 18, 2020

(54) LOW-TEMPERATURE TELLURITE GLASS MIXTURES FOR VACUUM COMPACTION AT TEMPERATURES OF 450 DEGREES C OR LESS

(71) Applicant: Ferro GmbH, Frankfurt am Main (DE)

(72) Inventors: Dieter Gödeke, Bad Soden a. T. (DE); Srinivasan Sridharan, Strongsville, OH (US)

(73) Assignee: Ferro GmbH, Frankfurt am Main (DE)

( * ) Notice: Subject to any disclaimer, the term of this patent is extended or adjusted under 35 U.S.C. 154(b) by 31 days.

(21) Appl. No.: 16/301,008

(22) PCT Filed: Apr. 11, 2017

(86) PCT No.: PCT/EP2017/058595
§ 371 (c)(1),
(2) Date: Nov. 13, 2018

(87) PCT Pub. No.: WO2017/202539
PCT Pub. Date: Nov. 30, 2017

(65) Prior Publication Data
US 2019/0177208 A1    Jun. 13, 2019

(30) Foreign Application Priority Data
May 23, 2016    (DE) .......................... 10 2016 109 414

(51) Int. Cl.
*C03C 8/24*     (2006.01)
*C03C 3/12*     (2006.01)
(Continued)

(52) U.S. Cl.
CPC ................ *C03C 8/24* (2013.01); *C03C 3/122* (2013.01); *C03C 3/125* (2013.01); *C03C 3/14* (2013.01);
(Continued)

(58) Field of Classification Search
CPC ....................................................... C03C 8/24
See application file for complete search history.

(56) References Cited

U.S. PATENT DOCUMENTS 5,188,990 A     2/1993  Dumesnil et al.
8,551,368 B2   10/2013  Nakamura et al.
(Continued)

FOREIGN PATENT DOCUMENTS

CN          101164942 A      4/2008
DE      102016109414 A1     11/2017
(Continued)

OTHER PUBLICATIONS

Espacenet bibliographic data for CN101164942 published Apr. 23, 2008, one page.
(Continued)

*Primary Examiner* — Karl E Group
(74) *Attorney, Agent, or Firm* — Rankin, Hill & Clark LLP; Christopher Jan Korff

(57) ABSTRACT

The present invention relates to a glass, in particular a glass for joining glass panes in order to produce vacuum insulated glasses at processing temperatures of ≤450° C., to the corresponding composite glass, and to the corresponding glass paste. The present invention further relates to a vacuum insulated glass produced by means of the glass paste according to the invention, to the production process thereof, and to the use of the glass according to the invention or of the composite glass and of the glass paste. The glass according to the invention is characterized in that said glass comprises the following components in wt %: $TeO_2$—$V_2O_5$ glass in the range of 60-100 wt %, high temperature glasses, selected from the group consisting of lead glass, bismuth glass, zinc glass, barium glass, calcium glass, alkali silicate glass, in the range of 0-20 wt %, and reactive oxides, selected from the group consisting of $Al_2O_3$, $Y_2O_3$, $La_2O_3$,
(Continued)

The dependence of the ball point temperature on the volume concentration of the additive ZnO, $Bi_2O_3$, $SiO_2$, $ZrO_2$, zircon, $Nb_2O_5$, $V_2O_5$, $TeO_2$, $CeO_2$, SnO, $SnO_2$, FeO, MnO, $Cr_2O_3$, CoO, oxide pigments, or a combination thereof, in the range of 0-20 wt %.

15 Claims, 1 Drawing Sheet

(51) Int. Cl.
- *C03C 27/06* (2006.01)
- *C03C 3/14* (2006.01)
- *C03C 8/02* (2006.01)
- *C03C 8/04* (2006.01)
- *C03C 8/14* (2006.01)
- *C03C 8/20* (2006.01)
- *C03C 8/22* (2006.01)

(52) U.S. Cl.
CPC ............... *C03C 8/02* (2013.01); *C03C 8/04* (2013.01); *C03C 8/14* (2013.01); *C03C 8/20* (2013.01); *C03C 8/22* (2013.01); *C03C 27/06* (2013.01)

(56) References Cited

U.S. PATENT DOCUMENTS

| | | | |
|---|---|---|---|
| 9,290,408 | B2 | 3/2016 | Dennis |
| 10,153,389 | B2 | 12/2018 | Gödeke et al. |
| 2010/0180934 | A1 | 7/2010 | Naito et al. |
| 2013/0104980 | A1 | 5/2013 | Sridharan et al. |
| 2014/0008587 | A1 | 1/2014 | Yoshida et al. |
| 2014/0299256 | A1 | 10/2014 | Sridharan et al. |
| 2017/0243995 | A1* | 8/2017 | Godeke ............ C03C 8/14 |

FOREIGN PATENT DOCUMENTS

JP 2004356394 A 12/2004
WO WO-2016050668 A1 * 4/2016 ........... E06B 3/6612

OTHER PUBLICATIONS

Espacenet bibliographic data for JP2004356394 published Dec. 16, 2004, one page.
Machine translation for DE102016109414 published Nov. 23, 2017, one page.
International Search Report for corresponding PCT/EP2017/058595 dated Jul. 24, 2017, two pages.

* cited by examiner

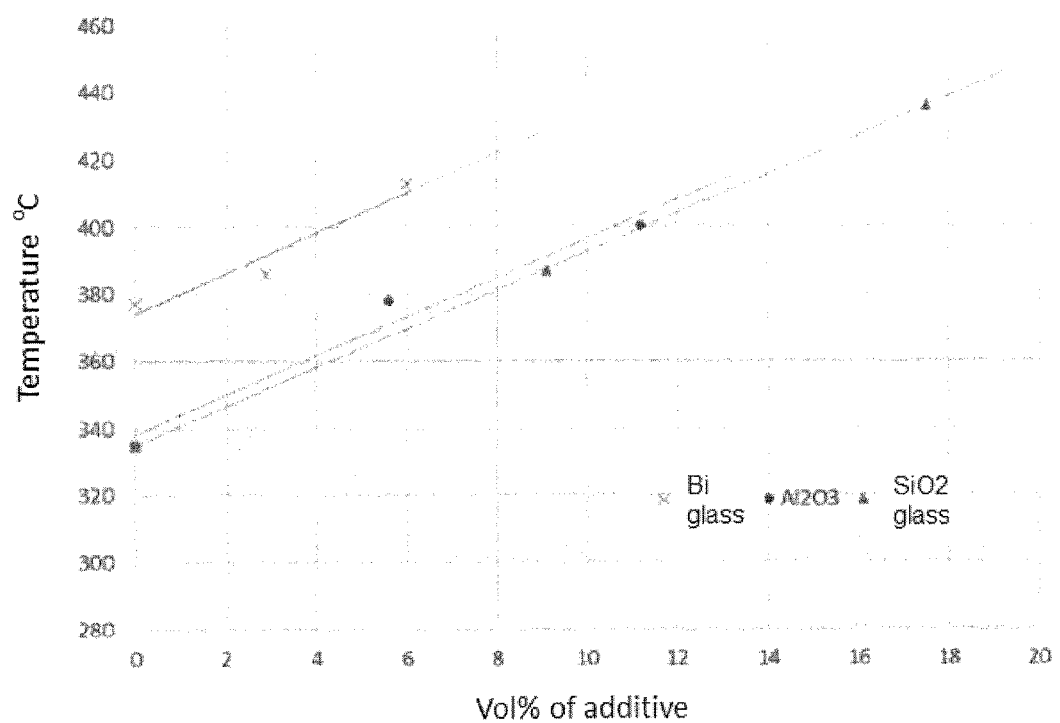
The dependence of the ball point temperature on the volume concentration of the additive

LOW-TEMPERATURE TELLURITE GLASS MIXTURES FOR VACUUM COMPACTION AT TEMPERATURES OF 450 DEGREES C OR LESS

The present invention relates to a glass, in particular a glass for joining glass panes in order to produce vacuum insulated glasses at processing temperatures of ≤450°, to the corresponding composite glass, and to the corresponding glass paste. The present invention further relates to a vacuum insulated glass produced by means of the glass paste according to the invention, to the production process thereof, and to the use of the glass according to the invention or of the composite glass and of the glass paste.

PRIOR ART

Glasses used to join glass, ceramic and metal objects are glasses with particularly low softening temperatures. They are also referred to as glass solders or joining glasses. The term "joining" is understood to mean the correct bringing together or bonding of workpieces by appropriate processes (welding, rolling, soldering, etc.). Glass solders or joining glasses are extensively described in the prior art. In particular, joining glasses are used in the semiconductor sector, in high-temperature fuel cells or in applications in solar cells. However, the use of joining glasses in the production of vacuum insulated glass has hardly been described.

Vacuum insulated glasses are known and already commercially available. In vacuum insulated glasses the glass gap between the two single panes is evacuated. In the case of conventional insulating glass, the glass gap is usually filled with a noble gas. Also, the glass gap of the vacuum insulated glass is significantly smaller due to the lack of convection between the two individual panes. The individual panes are usually spaced apart by so-called spacers, which are distributed in a lattice-like manner over the glass surface, so that the external air pressure does not compress the two individual panes, and said individual panes are bonded together at the edges by an edge compound over the entire circumference.

Vacuum insulated glass panes are usually produced by placing and fixing spacers on the first individual glass pane and then laying the second individual glass pane on top. In its edge region said second individual glass pane has a bore with suction port for the subsequent evacuation. The bonding of the two glass panes along their edges is achieved, for example, by means of glass solder. While tellurium containing glasses are used as fiber materials and in conductive contacting pastes for solar cells, they are also used as optical amplifiers in Er-doped fiber amplifiers in so-called WDM (wavelength division multiplexing). In the field of solder glasses and bonding glasses, they are still largely unknown. In particular, they are not described for use in the production of vacuum insulated glasses.

The prices of tellurium oxide vary widely, but tellurium oxide can be produced economically at reasonable cost. The glass family has excellent glass formation properties and low melting temperatures not achieved by other conventional glasses.

U.S. Pat. No. 5,188,990 describes tellurium vanadate glasses for semiconductor applications (so-called Cerdip packages). Joining partners are ceramics: alumina. The glass composition consists essentially of $TeO_2$ and $V_2O_5$ and oxides selected from the group consisting of $Nb_2O_5$, $ZrO_2$ and ZnO, $Bi_2O_3$ and CuO and $P_2O_5$ and $Ta_2O_5$, and further up to 10% of oxides of zinc, cadmium, barium, tungsten, molybdenum and titanium. The glasses described herein also have no aluminum oxide and the expansion coefficient is in a range between $14\text{-}18\times10^{-6}$/K. The high expansion coefficient is disadvantageous for an application of a glass/glass joining because a higher content of fillers must be used. The fillers used here, inter alia, niobium pentoxide, are also disadvantageous. A glass/glass joining was not investigated.

WO2013/043340 A1 from Guardian describes highly vanadium-containing joining glasses for the production of vacuum insulated glass panes. The main components are vanadium oxide, barium oxide and zinc oxide. However, the glasses used in this case have a very high vanadium content (between 50-60 wt. %) and they contain no or only very small amounts of tellurium oxide. These glasses are less chemically resistant and more susceptible to crystallization.

The $V_2O_5$—$B_2O_3$—$TeO_2$ glasses described by F. Wang et al., Materials Letters 67, 196-198 (2012) differ from the present invention in the content of boric oxide. The present invention comprises boron-oxide-free glasses. In addition, the study shows that the glasses from the system have a partly pronounced crystallization tendency (below 400° C.).

U.S. Pat. No. 8,551,368 B2 describes tellurium-containing glasses for use in solar cell contacting pastes. The paste described comprises silver as the main constituent, a glass frit and an organic support, the glass frit containing tellurium oxide as a network-forming component and also tungsten and molybdenum oxides. Chemically, the glasses described in this case differ by the content of tungsten oxide ($WO_3$) and the absence of vanadium pentoxide.

US2010/0180934A1 describes a glass composition with low softening point for electronic components, said glass composition being essentially free of lead, bismuth and antimony. The vanadium oxide content is 40-65 weight percent and the tellurium content is relatively low at 20-30 weight percent.

CN101164942 A discloses a lead-free tellurate glass of tellurium oxide and vanadium oxide in which small amounts of zinc oxide or aluminum oxide may be present.

US2014/008587A1 describes a conductive paste comprising a glass frit comprising tellurium as a network-forming component in an amount of 35 to 70 mol %, based on the oxide. In addition, silver is present in an amount of 3 to 40 mol %, based on the oxide, and also tungsten and molybdenum may be present. The addition of vanadium oxide is not mentioned.

JP 2004356394A describes a sealing material which contains a glass component which, in addition to vanadium pentoxide and tellurium dioxide, may contain up to 10% zinc oxide and small amounts of aluminum oxide.

There are certain limits in the processes for producing vacuum insulated glass panes of the prior art. The occasionally very high joining temperature is disadvantageous.

Currently, joining temperatures less than 400° C. are achieved only with joining glasses with high lead content whose chemical resistance can be considered as insufficient and which are in the way of a global market launch from an environmental point of view. Bismuth-containing glasses fail in use because these glasses are very sensitive to crystallization with softening beginning above 400° C. In addition, their flow behavior is greatly affected by the addition of fillers, which reduces the wettability of the glasses with their composite material.

PCT/EP2015/072207 describes low temperature tellurite joining glasses for joining vacuum insulated glass and for other applications such as MEMS joining at ≥420° C. Many such joining processes take place not only at atmospheric pressure, but also under reduced pressure applications such as light vacuum (about 100-600 mbar), medium vacuum (0.01-100 mbar) and high vacuum (<0.01 mbar). Depending on the glass composition and the thickness and type of joining materials, prior to sintering, larger pores may be generated due to a reduction of the components in glass or simply by enlargement of the other pores in the joint structures. Thus, new approaches are needed to achieve satisfactory results in the joining under vacuum above the glass transition temperature Tg of the joining glass.

For this reason, the present invention has been completed.

The Object of the Invention

The object of the present invention is to control pore formation under vacuum firing conditions by performing a viscosity control of the product glass, which was melted at the joining temperature (at atmospheric pressure or slight vacuum conditions) and then subjected to a vacuum above the Tg of the joining glass.

BRIEF DESCRIPTION OF DRAWINGS

FIGURE shows the dependence of the ball point temperature on the volume concentration of the additive.

DETAILED DESCRIPTION OF THE INVENTION

The invention provides several options to control the viscosity:
a) providing a $TeO_2$—$V_2O_5$ glass and
b) addition of high temperature glasses or
c) addition of reactive fillers, mainly oxide-based, which are added to the joining mixture or
d) combinations of a) with b) and c).

The above object has been achieved by providing a glass, in particular joining glass, which comprises the following components in wt %:
  $TeO_2$—$V_2O_5$ glass in the range of 60-100 wt %,
  high-temperature glasses selected from the group consisting of lead glass, bismuth glass, zinc glass, barium glass, calcium glass, alkali silicate glass, in the range of 0-20 wt %, and
  reactive oxides, selected from the group consisting of $Al_2O_3$, $Y_2O_3$, $La_2O_3$, ZnO, $Bi_2O_3$, $SiO_2$, $ZrO_2$, zircon, $Nb_2O_5$, $V_2O_5$, $TeO_2$, $CeO_2$, SnO, $SnO_2$, FeO, MnO, $Cr_2O_3$, CoO, oxide pigments, or a combination thereof, in the range of 0-20 wt %.

A preferred embodiment is when $TeO_2$—$V_2O_5$ glass, high temperature glasses and reactive oxides are used:
  $TeO_2$—$V_2O_5$ glass in the range of 60-100 wt %,
  high-temperature glasses selected from the group consisting of lead glass, bismuth glass, zinc glass, barium glass, calcium glass, alkali silicate glass, in the range of 0.5-20 wt %, and
  reactive oxides, selected from the group consisting of $Al_2O_3$, $Y_2O_3$, $La_2O_3$, ZnO, $Bi_2O_3$, $SiO_2$, $ZrO_2$, zircon, $Nb_2O_5$, $V_2O_5$, $TeO_2$, $CeO_2$, SnO, $SnO_2$, FeO, MnO, $Cr_2O_3$, CoO, oxide pigments, or a combination thereof, in the range of 0.5-20 wt %.

The requirement profile of a joining glass/composite as a solder for vacuum insulated glass panes is as follows:
  joining temperature ≥400° C.
  thermal expansion coefficient of the composite glass (joining glass+filler) between $7.5$-$9 \times 10^{-6}$/K
  compatibility with standard fillers: cordierite, beta-eucryptite between 1-25 wt %
  Begin of softening of the glass >300° C. (softening beginning >300° C. is necessary to ensure sufficient binder burnout of the glass with standard media.)
  no crystallization of the glasses in powder form between 300-420° C.
  moisture resistance, low water solubility
  good bonding of the glass to float glass (both on the bath side and on the air side)
  compatibility of the glass with standard solvents BDG, DPM
  processing in air
  possibility of processing by fast heating ramps and cooling ramps
  lead free, cadmium free
  ensuring a hermetic, low stress glass/glass composite
  possibility of industrial processing by means of dispensing, digital printing technology, screen printing etc.

Due to the low joining temperature, thermally toughened glass panes can also be joined without losing their preload. In addition, due to the relatively low joining temperatures, it is possible to process coated float glasses without damaging the coating (low-E) of the glasses. This facilitates a simpler structure, since the use of thinner panes weight can be saved. Other applications in the field of conductive glass pastes (solar cell applications), as additives for automotive glass paints, are also conceivable.

The $TeO_2$—$V_2O_5$ glass consists preferably of

| | |
|---|---|
| $TeO_2$ | 40-61 wt %, |
| $V_2O_5$ | 9-40 wt %, |
| $Al_2O_3$ | 5-20 wt %. |

A preferred range is

| | |
|---|---|
| $TeO_2$ | 50-61 wt %, |
| $V_2O_5$ | 20-35 wt %, |
| $Al_2O_3$ | 10-20 wt %. |

Very particularly preferred is the use of the following glass:

| | |
|---|---|
| $TeO_2$ | 56.00 wt %, |
| $V_2O_5$ | 32.00 wt %, |
| $Al_2O_3$ | 12.00 wt %. |

The high-temperature glass preferably consists of bismuth glass, with

| | |
|---|---|
| $Bi_2O_3$ | in the range of 75-85 wt %, |
| ZnO | in the range of 9-15 wt %, and |
| $B_2O_3$ | in the range of 5-12 wt %. |

The reactive oxides are preferably selected from the group consisting of $Al_2O_3$, $Y_2O_3$, $La_2O_3$, ZnO, $Bi_2O_3$, $SiO_2$, $ZrO_2$, zircon, $Nb_2O_5$, or combinations thereof. Most preferably, the reactive oxides are selected from the group consisting of $Al_2O_3$, $Y_2O_3$, $Bi_2O_3$, ZnO, or combinations thereof.

Another aspect of the invention is a composite glass, further comprising a filler in addition to the glass according to the invention.

This filler is in the range of 1 to 25 wt % and is selected from cordierite or eucryptite. Preferred is a filler range of 20-25 wt %.

Another subject of the invention is a glass paste which is produced from the glass according to the invention or from the composite glass according to the invention by means of a screen printing medium. It is preferred that the glass paste comprises a binder. Here, preferably a polypropylene carbonate is used.

Another subject of the invention is a process for producing a vacuum insulated glass. In the process shown herein, the glass solder according to the invention is used in the form of a paste, which is, however, only illustrated by way of example. Alternatively, the glass solder itself or the composite material can also be used to produce a vacuum insulated glass.

The process is characterized by the following steps:
applying the glass paste according to claims 8-9 onto a glass substrate,
drying the paste on the glass substrate for 10 minutes at 130° C.,
heating the glass substrate to a temperature of 300° C. for 30-60 minutes,
heating to a joining temperature of 325-390° C. for 1-5 minutes,
cooling to room temperature,
attaching a second glass substrate,
heating to a joining temperature of 325-390° C. for 10-15 minutes, and
evacuating the glass/glass composite while cooling to room temperature.

Another subject of the invention is the vacuum insulated glass, which was produced by the process described above.

The glass solder according to the invention, the composite glass according to the invention and the glass paste according to the invention are used as joining material for glass panes for the production of vacuum insulated glasses.

In addition, uses as joining material for solar cell applications and as additives for automotive glass paints are also contemplated.

The following raw materials can be used for the production of the joining glasses:
tellurium oxide powder 75-80% d50=3-10 µm
vanadium pentoxide $V_2O_5$ 95-99%
calcined alumina The raw materials are well mixed in a planetary mixer, paddle mixer, etc. and melted in a ceramic crucible, refractory material under air at 650-750° C. in an electric furnace.

The low melting temperatures are necessary to prevent evaporation of the $TeO_2$. Melting under oxidizing conditions is necessary but no $O_2$ bubbling. Quenching may be in water or optionally on water-cooled rollers. The glass has a reddish, brown black color. Quenching the glass on a roller is not trivial due to the low viscosity of the glass. Here a casting is recommended at temperatures of about 650° C. In order to prevent the subsequent re-melting of the glass with each other, the use of double-rotating rollers is recommended.

Subsequently, the quenched frit is ground to particle sizes $d90 \leq 60$ µm in ball mills, jet mills, etc. Optionally, the CTE is set either during grinding by adding a ceramic filler or in a final mixing step.

For the production of the glass, the glass is processed with a screen printing medium 801022 or 801026 via a three-roll mill to form a paste.

Preferably, the glass may be processed with a binder of polypropylene carbonate (e.g. QPac 40 binder, company: Empower materials, USA). This binder has the advantage that it decomposes at temperatures as low as 250-300° C. and thus ensures that no carbon residues remain trapped in the joining glass.

The glasses are then applied to the glass substrate by means of a dispenser: h=0.3-0.5 mm, b=4-6 mm, and the paste is dried with the float glass for 10 minutes at 130° C. Ideally, the glass solder-coated float glass is heated in an oven with electrically heated infrared elements to a temperature of 300° C. and held at this temperature for 30-60 minutes, then heated to the joining temperature of 325-390° C., held for 1-5 minutes, and cooled to room temperature. In a second process step, the second float glass pane can be placed on the pre-coated float glass pane and mechanically fixed by means of clamping. Spacers between the panes ensure a uniform soldering height.

In the following firing cycle, the composite is heated directly to the joining temperature of 325-390° C. and held at this temperature for 10-15 minutes. Finally, the composite is cooled again to room temperature. This process ensures that the composite is largely free of pores, since the binder has been burned out at 300° C. Individual process steps are carried out at reduced atmospheric pressure such as light vacuum (about 100-600 mbar), medium vacuum (about 0.1-100 mbar) and high vacuum (<0.01 mbar) to control pore formation.

The invention will now be described by way of examples, which do not limit the invention.

Exemplary Embodiments

High-temperature glasses selected from the group consisting of lead glass, bismuth glass, zinc glass, barium glass, calcium glass, alkali silicate glass in the range of 0.5-20 wt %, were added to the joining glass mixtures from PCT/EP2015/072207. Here, an advantageous effect at joining conditions in a vacuum was observed.

Furthermore, reactive oxides selected from the group consisting of $Al_2O_3$, $Y_2O_3$, $La_2O_3$, ZnO, $Bi_2O_3$, $SiO_2$, $ZrO_2$, zircon, $Nb_2O_5$, $V_2O_5$, $TeO_2$, $CeO_2$, SnO, $SnO_2$, FeO, MnO, $Cr_2O_3$, CoO, oxide pigments, or a combination thereof, in the range of 0.5-20 wt %, were added to the joining glass mixtures from PCT/EP2015/072207. Here, the particle size of the reactive oxides is 0.1-4 µm, preferably 0.1 to 20 µm.

Test conditions: pellet test and flow test both at atmospheric pressure firing conditions and vacuum firing conditions at 400, 100, 10, 0.1 and 0.01 mbar.

Success criteria: wetting and bonding to the glass substrate, no foaming in the pellet tests, as well as in the cross sections.

The results are promising, there is good bonding to the float glass. Flow at temperatures ≤450° C., more preferably ≤420° C., no foaming during vacuum firing.

Preferred reactive oxides: $Y_2O_3$, ZnO, $Bi_2O_3$, $Al_2O_3$

It is also possible to use mixtures of the reactive oxides.

It is also conceivable, after the application of vacuum, to fill the vacuum device with inert gas ($N_2$ or argon) to protect certain components during the joining process.

In the following two examples will be described specifically.

Example 1: Addition of Different Amounts of a Bismuth-Containing Glass to a Tellurium Vanadium Glass 5 wt % or 10 wt % EG9824 were added to TDF9533a. (TDF9533a, composition $TeO_2$ 56.00 wt %, $V_2O_5$ 32.00 wt % and $Al_2O_3$ 12.00 wt %, EG9824A7: $Bi_2O_3$—ZnO—$B_2O_3$ glass). Table 1 shows clearly the increase in the softening point and the respective temperatures with increasing concentration of EG9824.

TABLE 1

| Addition of bi glass | Heating microscopy | | |
|---|---|---|---|
| | TDF9533a | TDF9533a | TDF9533a |
| wt % | 0 | 5 | 10 |
| vol % | 0 | 2.9 | 6 |
| Softening point (° C.) | 352 | 352 | 372 |
| Ball point temperature (° C.) | 377 | 386 | 413 |
| Hemisphere point temperature (° C.) | 435 | 452 | 505 |
| Flow temperature (° C.) | 920 | 985 | 992 |

Example 2: Addition of Different Amounts of $Al_2O_3$ to a Tellurium Vanadium Glass

TABLE 2

| Addition of $Al_2O_3$ | Heating microscopy | | |
|---|---|---|---|
| | TDF9533a | TDF9533a | TDF9533a |
| wt % | 0 | 5 | 10 |
| vol % | 0 | 5.6 | 11.2 |
| Softening point (° C.) | 323 | 346 | 369 |
| Ball point temperature (° C.) | 335 | 378 | 400 |
| Hemisphere point temperature (° C.) | 397 | 433 | 475 |
| Flow temperature (° C.) | 426 | 499 | >1350 |

Example 3 Addition of Different Amounts of $SiO_2$ to a Tellurium Vanadium Glass

TABLE 3

| Addition of $SiO_2$ | Heating microscopy | | | |
|---|---|---|---|---|
| | TDF9533a | TDF9533a | TDF9533a | TDF9533a |
| wt % | 0 | 5 | 10 | 20 |
| vol % | 0 | 9.1 | 17.5 | 32.3 |
| Softening point (° C.) | 323 | 352 | 347 | 412 |
| Ball point temperature (° C.) | 335 | 387 | 436 | |
| Hemisphere point temperature (° C.) | 397 | 447 | | |
| Flow temperature (° C.) | 426 | 1010 | >1350 | >1350 |

If there is no information in the table, the temperature is not reached.

The changes in the softening point, the ball point temperature at vol % 0 are due to the use of different particle sizes of the cordierite filler. A particle size of cordierite of d50 of about 20 μm has proven to be suitable.

Figure shows the dependence of the ball point temperature on the volume concentration of the additive.

The invention claimed is:

1. A joining glass composition comprising:
   60-99 wt % of a $TeO_2$—$V_2O_5$ glass,
   0.5-20 wt % of a high-temperature glass selected from the group consisting of lead glass, bismuth glass including 75-85 wt % $Bi_2O_3$, 8-15 wt % ZnO, 5-12 wt % $B_2O_3$, calcium glass, alkali silicate glass, and combinations thereof, and
   0.5-20 wt % of a reactive oxide selected from the group consisting of $Y_2O_3$, $La_2O_3$, $Bi_2O_3$, $SiO_2$, $ZrO_2$, zircon, $Nb_2O_5$, and combinations thereof.

2. The joining glass composition according to claim 1, wherein the $TeO_2$—$V_2O_5$ glass comprises 40-61 wt % $TeO_2$, 9-40 wt % $V_2O_5$, and 5-20 wt % $Al_2O_3$.

3. The joining glass composition according to claim 2, wherein the $TeO_2$—$V_2O_5$ glass comprises 50-61 wt % $TeO_2$, 20-35 wt % $V_2O_5$, and 10-20 wt % $Al_2O_3$.

4. The joining glass composition according to claim 1, wherein the high-temperature glass comprises the bismuth glass.

5. The joining glass composition according to claim 1, further comprising a filler in the range of 1-25 wt % with respect to a total combined amount of the $TeO_2$—$V_2O_5$ glass, the high-temperature glass, and the reactive oxide.

6. The joining glass composition according to claim 5, wherein the filler comprises cordierite, eucryptite, or a combination thereof.

7. The joining glass composition according to claim 1, further comprising a binder and a solvent.

8. A method of producing a vacuum insulated glass comprising:
   applying a glass composition according to claim 1 onto a first glass substrate,
   heating the glass composition and the first glass substrate to a temperature of 130° C. for 10 minutes,
   heating the glass composition and the first glass substrate to a temperature of 300° C. for 30-60 minutes,
   heating the glass composition and the first glass substrate to a joining temperature of 325-390° C. for 1-5 minutes,
   cooling the glass composition and the first glass substrate to room temperature,
   bringing a second glass substrate into contact with the glass composition and,
   heating the glass composition, the first glass substrate and the second glass substrate to the joining temperature of 325-390° C. for 10-15 minutes, and
   evacuating a gap between the first glass substrate and the second glass substrate while cooling the glass composition, the first glass substrate and the second glass substrate to room temperature.

9. The method according to claim 8, wherein the $TeO_2$—$V_2O_5$ glass comprises 40-61 wt % $TeO_2$, 9-40 wt % $V_2O_5$, and 5-20 wt % $Al_2O_3$.

10. The method according to claim 9, the $TeO_2$—$V_2O_5$ glass comprises 50-61 wt % $TeO_2$, 20-35 wt % $V_2O_5$, and 10-20 wt % $Al_2O_3$.

11. The method according to claim 8, wherein the glass composition further comprises a filler in the range of 1-25 wt % with respect to a total combined amount of the $TeO_2$—$V_2O_5$ glass, the high-temperature glass, and the reactive oxide.

12. The method according to claim 11, wherein the filler comprises cordierite, eucryptite, or a combination thereof.

13. The method according to claim 8, wherein a binder and a solvent are added to the glass composition to make a paste, and the paste, including the glass composition, is applied to the first glass substrate.

14. The method according to claim 8, wherein process steps are performed at a pressure that is below atmospheric pressure.

15. A glass paste comprising:
   a composite glass including:
   a) 75-99 wt % of a joining glass including:
      i. 60-99 wt % of a $TeO_2$—$V_2O_5$ glass;

ii. 0.5-20 wt % of a high-temperature glass selected from the group consisting of lead glass, bismuth glass including 75-85 wt % $Bi_2O_3$, 8-15 wt % ZnO, 5-12 wt % $B_2O_3$, calcium glass, alkali silicate glass, and combinations thereof;
iii. 0.5-20 wt % of a reactive oxide selected from the group consisting of $Y_2O_3$, $La_2O_3$, $Bi_2O_3$, $SiO_2$, $ZrO_2$, zircon, $Nb_2O_5$, and combinations thereof; and b) 1-25 wt % of a filler; and a screen printing medium including a binder and a solvent.

* * * * *